United States Patent [19]

Modisette et al.

[11] 4,419,692

[45] Dec. 6, 1983

[54] HIGH SPEED INFRARED IMAGING SYSTEM

[75] Inventors: James E. Modisette; Ralph B. Johnson, both of San Antonio, Tex.

[73] Assignee: Texas Medical Instruments, Inc., San Antonio, Tex.

[21] Appl. No.: 336,088

[22] Filed: Dec. 31, 1981

[51] Int. Cl.³ .............................................. H04N 7/18
[52] U.S. Cl. .................................... 358/113; 250/332; 250/334
[58] Field of Search ................ 358/113; 250/330, 332, 250/334

[56] References Cited

U.S. PATENT DOCUMENTS

| | | | |
|---|---|---|---|
| 3,631,248 | 12/1971 | Johnson | 358/113 |
| 3,718,757 | 2/1973 | Gulitz | 358/113 |
| 3,798,366 | 3/1974 | Hunt | 358/113 |
| 3,830,970 | 8/1974 | Hurley | 358/113 |
| 3,895,182 | 7/1975 | Trilling | 358/113 |
| 4,027,159 | 5/1977 | Bishop | 250/338 |
| 4,121,248 | 10/1978 | Coale | 358/113 |
| 4,142,206 | 2/1979 | Ennulat | 358/113 |
| 4,191,967 | 3/1980 | Dansac | 358/113 |
| 4,193,688 | 3/1980 | Watkins | 356/152 |
| 4,214,271 | 7/1980 | Jones | 358/113 |

Primary Examiner—Howard Britton
Attorney, Agent, or Firm—Dula, Shields & Egbert

[57] ABSTRACT

The present invention is a method of referencing and operating an infrared imaging system that may be used with virtually any system. A preferred embodiment of the invention is disclosed using a mechanical scanning mirror that minimizes spatial scan distortion.

20 Claims, 11 Drawing Figures

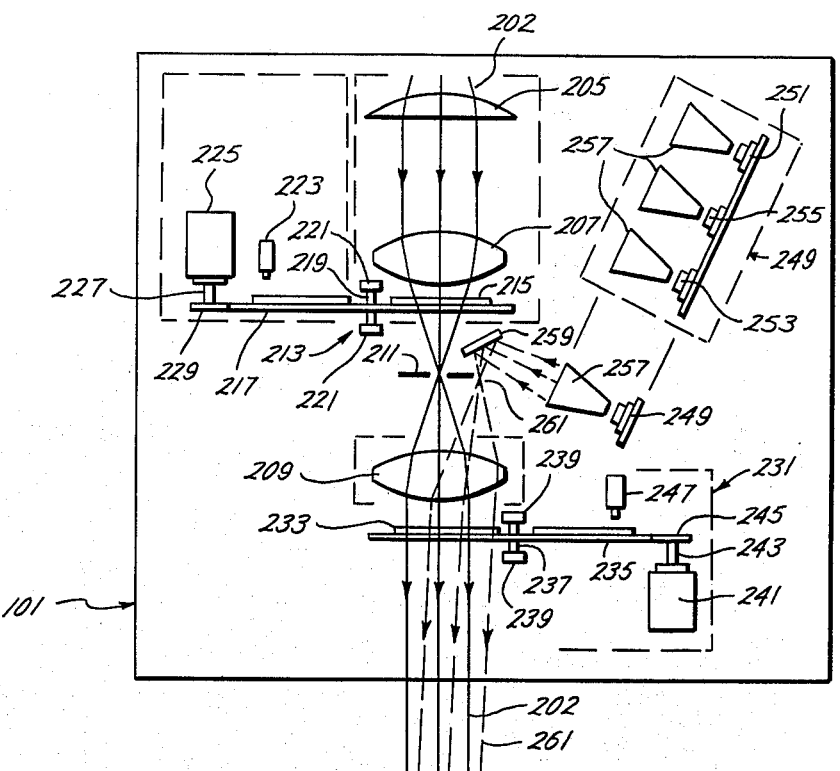
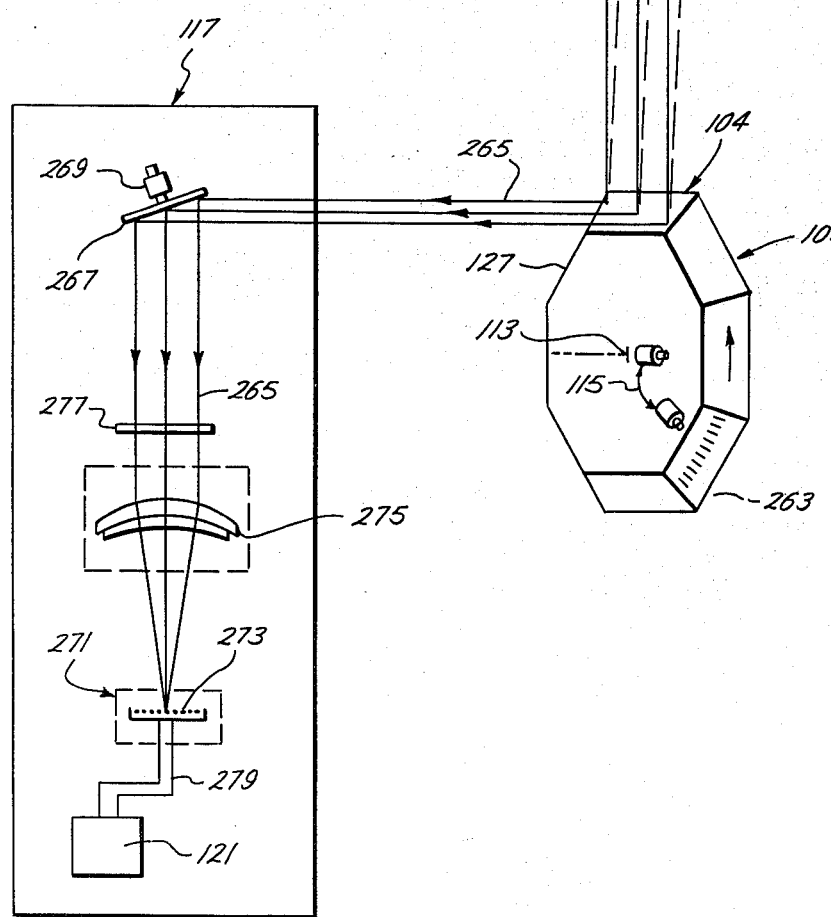
Fig. 1B

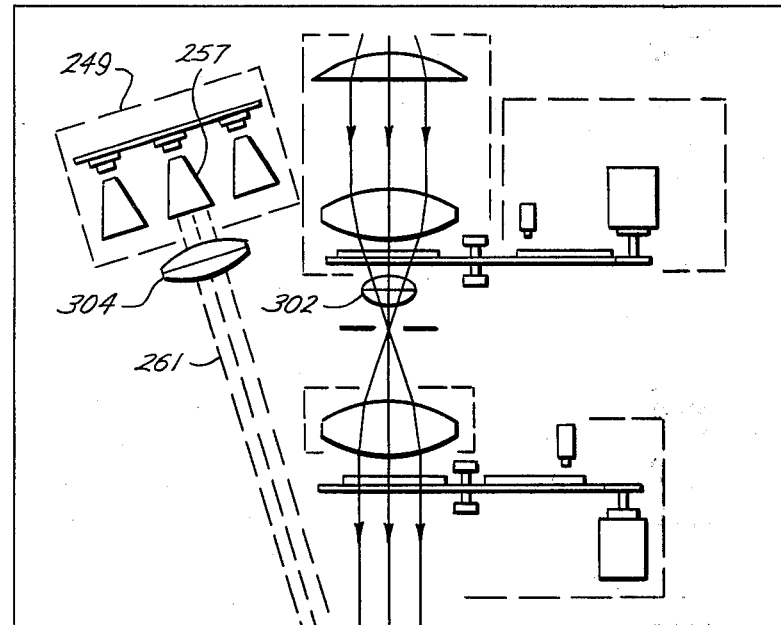
Fig. 1C
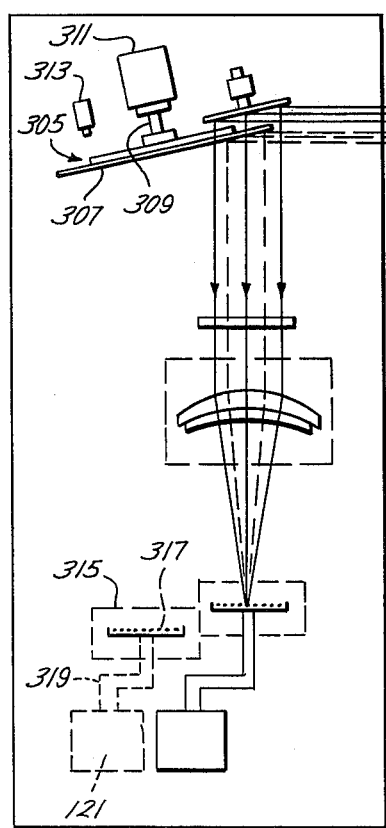
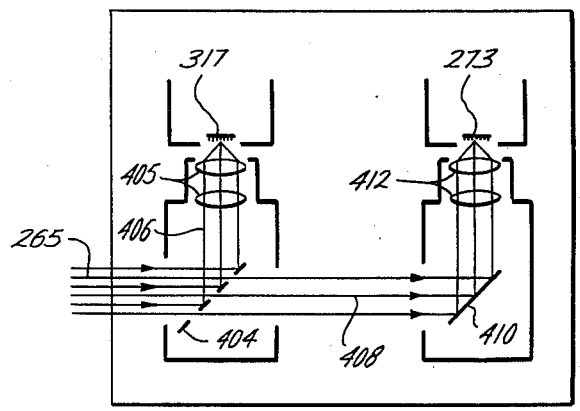
Fig. 2

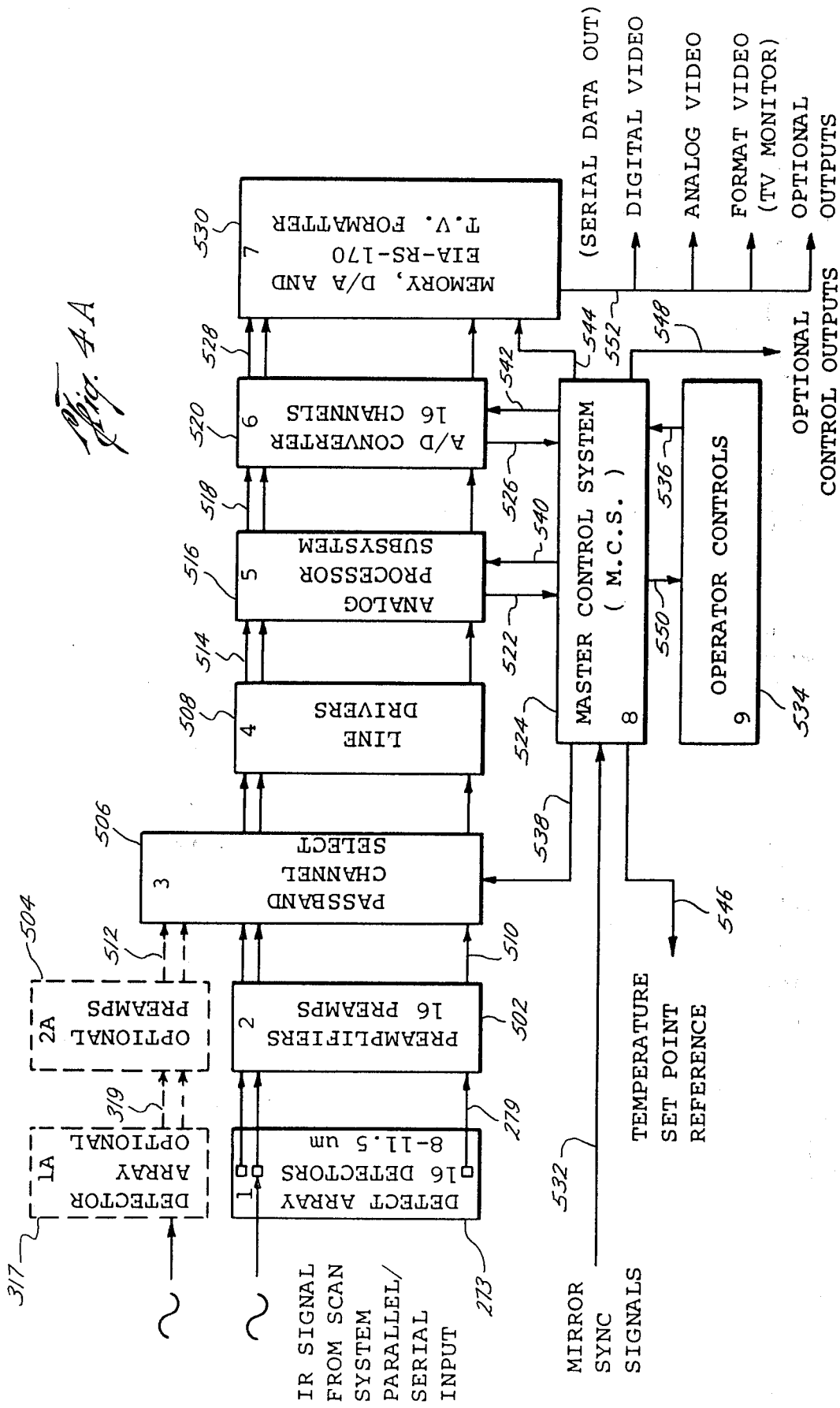

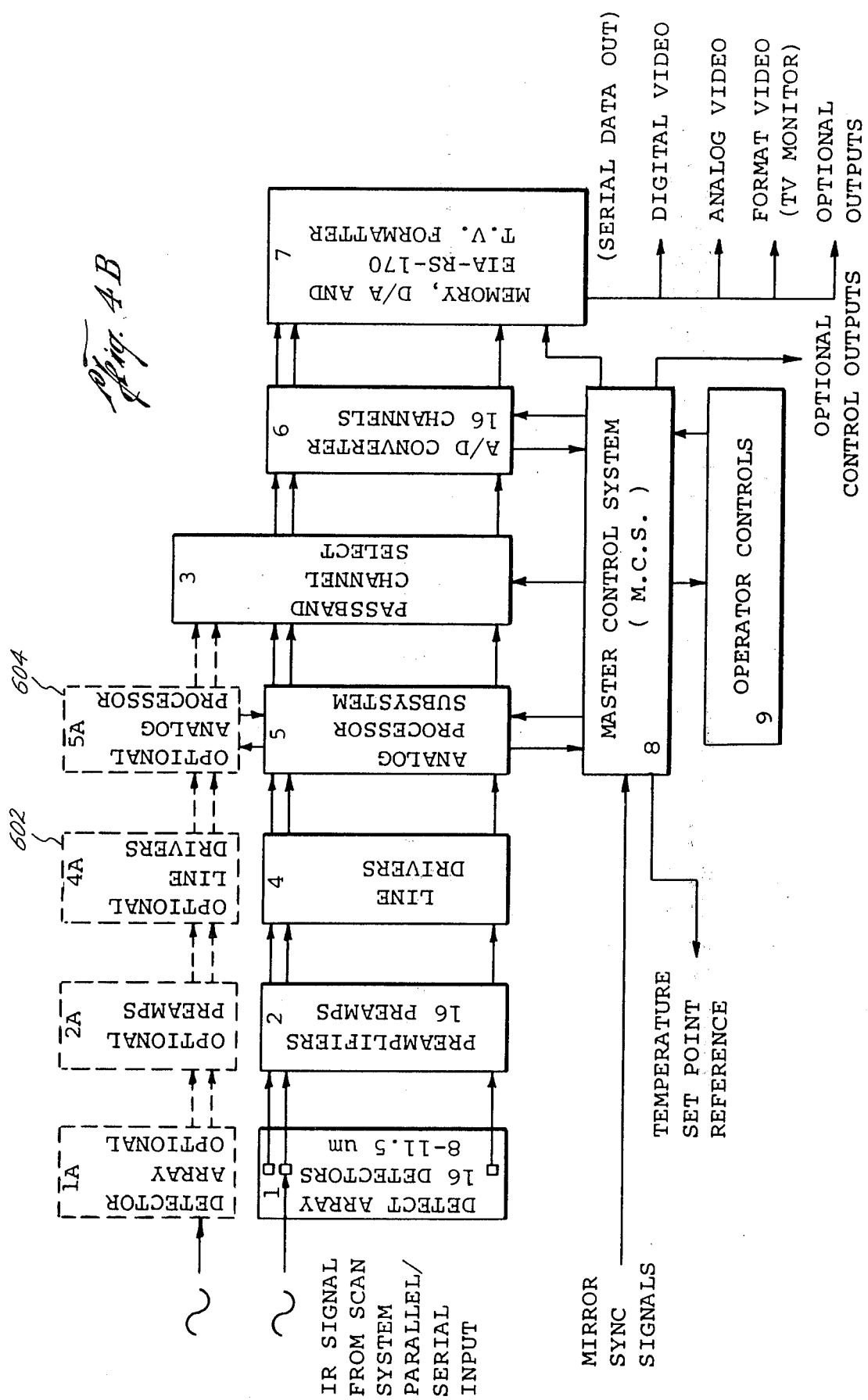

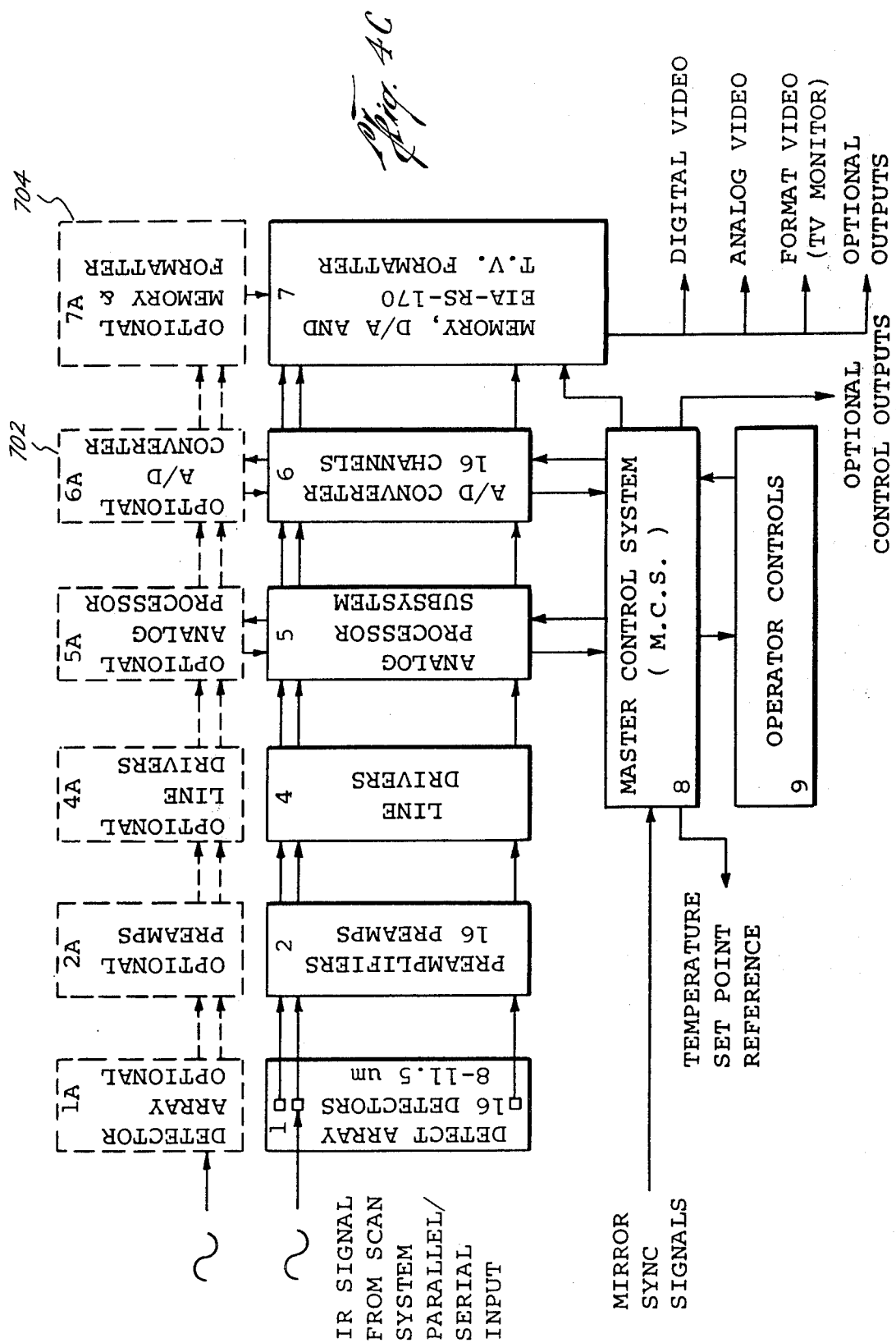

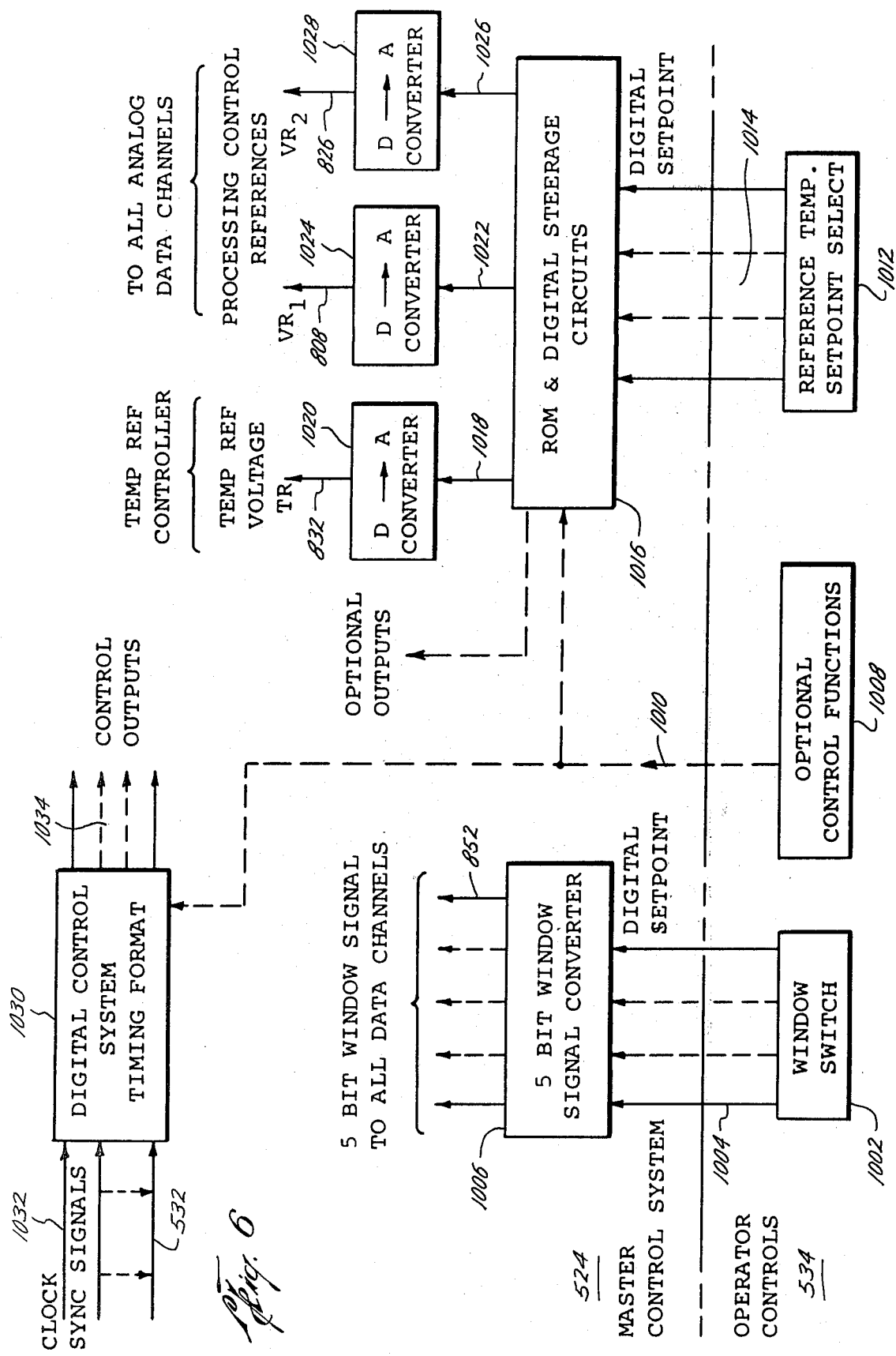

HIGH SPEED INFRARED IMAGING SYSTEM

BACKGROUND OF THE INVENTION

1. Field of the Invention

The present invention relates generally to infrared imaging systems and more specifically to a realtime, low distortion infrared imaging system capable of producing highly accurate thermal and spatial resolution images in more than one spectral band.

2. Background Art

All matter continuously emits and absorbs electromagnetic radiation. The infrared region of the electromagnetic spectrum can be conveniently divided into three regions called the "near infrared region" from 0.72 to 1.5 micrometers, the "intermediate infrared region" from 1.5 to 20 micrometers, and the "far infrared region" from 20 to more than 1,000 micrometers. These limits are somewhat arbitrary and result from the use of rather different detection devices in each of the regions.

In the near infrared region, images may be produced by infrared photographic emulsions. In the intermediate infrared region photoconductive and photovoltaic cells may be used to form images either through the use of scanning optics linear or mosaic arrays. The technology of infrared detectors over the last few decades has largely been a study in extending the wavelength response of infrared detectors.

The ideal absorber of infrared radiation, which is also an ideal radiator, is called a "blackbody". Any object that deviates from a perfect absorber or emitter is called a "non-blackbody radiator". All real world objects are such radiators although some, for example, lamp black, approximates an ideal blackbody.

The absorptance or emissivity of a substance in the visible region of the electromagnetic spectrum is no guide to its emissivity in the infrared. For example, a particular white paint can have a low emissivity in the visible, but be nearly equivalent to an ideal blackbody at wavelengths beyond 3 micrometers. This explains why an object covered with such a white paint would stay relatively cool in sunlight. It not only reflects much of the sunlight in the visible region of the spectrum, but it also reradiates the energy it has absorbed in the infrared region nearly as well as a blackbody. This is a common technique used to control the thermal balance of artificial satellites in space. A thorough discussion of the physics of infrared radiation may be found in *"The Infrared Handbook"*, edited by Bill Wolfe and George Zissis, available from the Infrared Information and Analysis Center, P.O. Box 618, Ann Arbor, Mich. 48107.

Since World War II the ability to produce infrared images has gained great commercial and military application. An infrared imaging system is generally intended to provide a visual display that reproduces a scene as viewed in the infrared, whether it be on a film or by means of mechanical or electronic scanning.

Prior art infrared imaging systems may be divided into three types:

(1) Electrically scanned systems that use infrared sensitive imaging tubes such as is shown in U.S. Pat. No. 4,191,967 (a pyroelectric tube) and U.S. Pat. No. 4,142,206 (showing a pyroelectric solid state imaging device). These imaging tubes have low resolution and are noisy. Prior art systems using such sensing tubes have no inherent temperature accuracy and provide only relative radiance information.

(2) Mechanically scanned systems such as those illustrated in U.S. Pat. No. 4,193,688 (which shows a porro prism scanning separately energizible detectors). These mechanical systems, because they use solid state detectors, can see further into the far infrared (the 3 to 12 micrometer band being most usable), but they are extremely slow. Additionally, mechanical systems use a large complex of highly precise, moving optical surfaces to collimate and scan the field of view. These mechanical scanning systems typically introduce a great deal of either or spatial angular distortion into the image. Like electronic scanners, most prior art mechanical scanning systems only images relative radiance.

(3) Infrared sensitive photographic emulsions may be of high resolution, but are limited in spectral and radiometric sensitivity and must be chemically processed, which makes them unless for realtime systems.

One class of infrared images, called forward-looking infrared (FLIR) sensors, mechanically scan object space and reproduce the image using an array of infrared detectors. The geometric distortions introduced by the mechanically fixed and scanning optics, combined with the electronic noise and signal distortions caused by multi-channel electronics, produce poor quality infrared images. This approach was adopted because of the great increase in speed required to look at the infrared world in real-time, usually for military purposes, to make decisions such as those required for the tracking and firing of weapons systems. Thus, a certain amoung of geometric distortion in the image may be acceptable. Likewise, the intrernal sensor background noise and streakiness associated with FLIR system due to the fact that the multi-channel electronics on the different detectors are not identical, are acceptable in some of these military applications. As a consequence of current art, the FLIR's parallel detector channels also have different reference signal points and system gains, i.e. they are not normalized. The current art FLIR, thus, inherently introduces both temperature (i.e., electronic noise and lack of absolute standards) and spatial inaccuracies into the image is displays.

Some attempts have been made to overcome these limitations. The attempts made by the present state of the art, however, do not go in the direction of the present invention, but rather toward such systems as are taught by U.S. Pat. No. 4,121,248, which teaches a streak reduction electronic processing system for a FLIR display. Likewise, U.S. Pat. No. 4,214,271 teaches a technique for DC restoration and an AC-coupled display system. Similarly, Report No. TREE8050 from Purdue University in Lafayette, Indiana entitled "A FLIR Target Detection Algorithm" Final Report, November 1980, by Tom Huang, teaches the use of digitizing and computer processing an image in an attempt to compensate by past-analysis the inherent defects of the FLIR infrared imaging system. It should be emphasized that many millions of dollars have been and are continuing to be spent to try to overcome these basic limitations of the FLIR system. None of these prior art solutions to the problem, however, address the electronic and geometric distortions, from a casual viewpoint, at the sensor and scanner level; they attempt to process the noisy and distorted signal back into some semblance of reality.

Thus all prior art devices are either slow, for example, infrared photographic emulsions or line-scanned devices such as the THERMISCOPE ™ as is taught by U.S. Pat. No. 3,631,248. Or they introduce temperature distortions within the image due to the difficulties of making multiple (up to several hundred) separate detector and electronic signal processing trains identical. Or they introduce spatial distortion due to the problems with present infrared reflective and/or refractive optics. Additionally, all present FLIR systems display only relaive radiance. Due to a lack of internal thermal reference standards, all FLIR prior art systems also have an inherent lack of thermal/radiance relative stability over time. All of these defects hold true even for slow systems that are mechanically or electronically scanned. When the speed of the system is increased to a point that it can be useful for realtime applications, these problems grow so severe that a vast and arcane art has developed to process deficient and distorted signals to make them the resulting image appear to be of higher quality. The problem unresolved by the prior art, is how to make a fast realtime infrared imaging system capable of producing highly accurate thermal and spatial resolution images.

An ideal infrared imaging system, as compared to present systems, would:

(1) Be spatially distortionless. (Present systems introduce mechanical scanning distortion.)

(2) Produce highly accurate thermal images that are referenced to the absolute radiance of a sensed standard (present FLIR systems display only relative radiance, they are not referenced).

(3) Normalize the output of each channel in a multichannel system against an internal reference at the midpoint of the imaged radiance. (Most present systems use no reference or clamp all channels to an arbitrary or average reference that does not allow for differences in detector response curves).

(4) Image two or more spectral bands in realtime.

(5) Interface with realtime video display or computer data acquisition systems with minimum storage or interface electronics (present systems require extremely complex delay line networks or large computer memories to store digitalized images).

As was mentioned above, neither the prior art, nor the present state of the art suggest being able to do all these things at one time. In fact, the present trend in the art is to accept basic problems as inevitable and to either use brute force engineering to minimize them or to process the signals produced by the prior art system to make the image look better. These "fixes" are necessary because the prior art does not treat the basic sensor and scanner problems stated above, but rather attempts to somehow minimize the symptoms caused by the problems.

For various reasons it is sometimes highly desirable to look at an infrared image in more than one portion of the infrared spectrum. For example, you might want to look at the infrared image in the 3 micrometers spectral band and then look at the same image in the 12 micrometers spectral band. In the past the only way to accomplish such an end would be either to use two separate systems and combine their output or to timeshare some elements of the system, usually the detector array. See, "IR System with Dual Field of View, Timeshare Processing of Two Images Uses Single Detector Array to Reduce Cost and Weight", National Technical Information Service Tech. Note No. G322SL3 (1980).

The state of the art is looking at different spectral regions may be found in U.S. Pat. No. 4,027,159, which teaches the combined use of visible and near infrared imaging with a far infrared detector that does not produce an image.

It is therefore an object of the present invention to provide a realtime infrared imaging system that is capable of rendering an accurate and noise-free thermal image without geometric distortion and with minimal noise.

Another object of the present invention is to provide an infrared imaging system capable of realtime observation of more than one spectral band.

Yet another object of the present invention is to provide a realtime infrared imaging system capable of imaging the actual energy flux or radiance emitted by a thermal source.

Yet another purpose of the present invention is to provide a realtime infrared imaging system whose output is electrically compatable with a video display or computer with minimum interface electronics.

SUMMARY OF THE INVENTION

The present invention is a method of referencing an opearting an infrared imaging system that may be used with virtually any system. A preferred embodiment of the invention is disclosed using a mechanical scanning mirror the minimizes spatial can distortion.

There reference radiance sources are scensed by an infrared imaging system:

Interchannel Detector/Electronics Normalization

Two of the references are fixed at known values. The first fixed reference is sensed and the output of each sensing channel of the system is clamped to an internal reference. The second fixed reference is the sensed and the resulting output of each channel is used to normalize the gain of each channel of the system.

Detector Response Curve Normalization

The radiance of the third reference is adjustable. Its radiance is adjusted as a function of the sensed radiance from the object space scanned by the system. Preferably this adjustable reference is set to the midpoint of the radiance range desired to be observed by the system. As the system senses this third reference, the third reference signal output of each channel of the system is again normalized.

These referencing procedures may be repeated as often as is necessary, even every frame, field or subfield (scan), to keep the multichannel electronics normalized and to normalize the output of the detectors closely about the sensed object space radiances to correct for differences in detector response curves.

Mirror Scanner

The preferred embodiment of the present invention uses a rotatable multi-sided mirror having a plurality of canted facets included to the rotation axis of the mirror. This mirror sweeps an image of object space across a multichannel infrared detector array. The rotation axis of the mirror is normal to the detector array of parallel to the object space being imaged. Each of the mirror's facets is inclined at a slightly different angle. Rotation of the mirror produces the horizontal scan of the object space while the vertical scan is accomplished by a mirror having each of its facets canted at a different angle about a nominal 45° angle. This configuration can be shown to produce no horizontal scanning distortion and, only a negligible positive vertical scanning distortion.

The number of detectors in the linear detector array and the number of facets on the scan mirror and the scan speed of the scan mirror are chosen such that the resulting analog parallel output is easily interfaceable with a video monitor or computer.

BRIEF DESCRIPTION OF THE DRAWINGS

FIG. 1B is a functional diagram of the optical scanning system of a preferred embodiment of the present invention;

FIG. 1C is a functional diagram of the scanning system of a second preferred embodiment of the present invention using a chopper wheel;

FIG. 2 is a schematic illustration of the Dewar tower of the present invention in an embodiment capable of simultaneously scanning two spectral passbands;

FIG. 4A is a schematic block diagram of a preferred embodiment of the present invention capable of selecting from one of two spectral regions;

FIG. 4B is a schematic block diagram of the imaging process and electronics of a second preferred embodiment of the present invention wherein the present invention is capable of displaying the two spectral passbands in alternating frames;

FIG. 4C is a schematic block diagram of the image processor electronics of another embodiment of the present invention which is capable of simultaneously displaying both spectral passbands;

FIG. 6 is a schematic block diagram of the operator control interfaces of the preferred embodiment of the present invention.

DETAILED DESCRIPTION OF THE PREFERRED EMBODIMENT

Figure 1A:
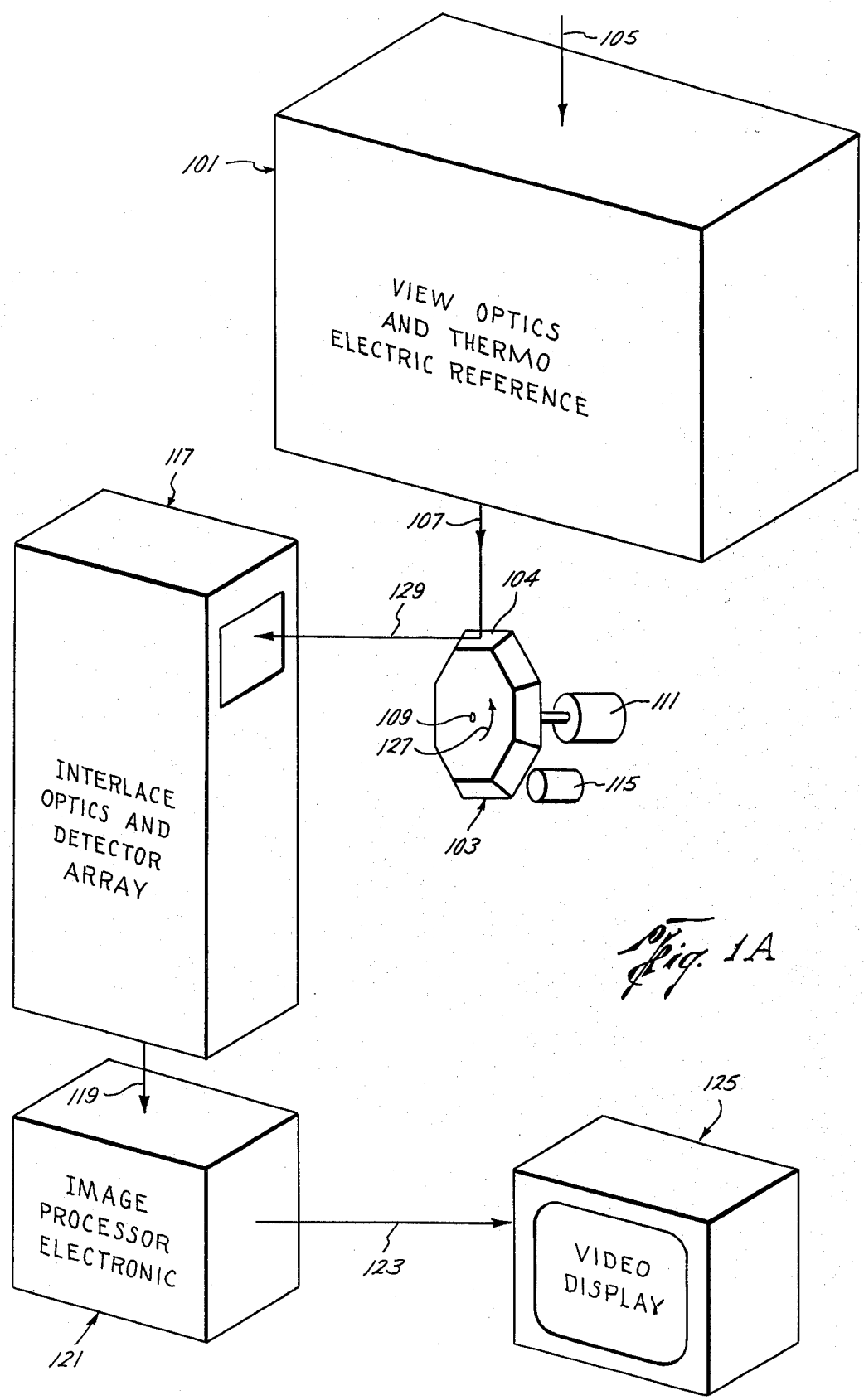
FIG. 1A is a simplified block diagram showing the major elements of a preferred embodiment of the present invention.

FIG. 1A is a simple isometric block diagram showing the functional relationship between the major components of the present invention.

View optics and thermal reference subsystem 101 is positioned with respect to mirror system 103 so infrared radiance 105 from object space (not shown) is presented, together with thermo-electric reference information, as an optical flux 107, which is substantially normal to the rotation axis 109 of mirror 103.

Mirror 103 has a plurality of canted faces. Specifically, mirror 103 as shown has eight (8) canted faces. A prime mover 111 is connected to a shaft 113. Shaft 113 engages mirror 103 along its rotation axis 109.

Each of the eight facets of canted mirror 103 is set within three and three-fourth degrees (3-¾°) of forty-five degree (45°) angle. The tilt between each facet is 0.9375°.

A mirror position sensor 115 is provided near the edge of mirror 103.

Interlace optics and detector array subsystem 117 is placed some distance from mirror 103 on a line with facet 104 that is normal to rotation axis 109. Interlace optics and detector array 117 is electrically connected by analog data path 119 to image processor electronics subsystem 121. Image processor electronics 121 is shown in FIG. 1 connected by a video cable 123 to a video display unit 125.

Functionally, infrared radiance from a scene in object space, not shown, enters on optical path 105 into the view optics 101 of the present invention. The view optics system refracts the incoming image information and provides the thermo-electric reference information, which passes out of view optics and reference system 101 along optical path 107 until it strikes face 104 of canted 8-sided mirror 103. Motor 111 rotates mirror 103 in the direction shown by arrow 127. The facets of canted face mirror 103 are displaced ±3.75° about a nominal 45° angle. The tilt between each facet is 0.9375°. Thus, one complete revolution of mirror 103 on its axis 113 will cause the present invention to scan a 15°×15° field of view. The information from this 15°×15° field of view is presented along optical path 129 to optional interlace optics and detector array 117.

The electrical output of the detector array, which in this embodiment of the present inventon is a 16 detector array, is fed in analog parallel form along signal paths 119 to image processor electronics 121. Image processor electronics 121 combines operator information, infrared sensor information resulting from exposure of the detectors to radiance from the object space, and infrared sensor information from the thermo-electric reference of the present invention to form an image or other useful information.

This infrared image is output through video channel 123 to video display 125 where it may be viewed by an operator.

The foregoing very simple block description is intended only to illustrate the functional relationship between the major components of the present invention, each of which will be described in more detail below.

FIG. 1B shows more detail of the view optics and thermo-electric reference 101, the mirror 103, and the interlace optics and detector array 117.

View optics and thermo-electric reference system 101 has a main optical path 202. A first refractive optical element 205 is placed in the optical path 202. A second refractive optical elements 207 is placed in path 202 between first element 205 and facet 104 of mirror 103. A third optical element 209, which functions as a collimator, is positioned between optical element 207 and facet 104. A field stop 211 is placed on optical path 202 between second refractive element 207 and collimating refractive element 209. The field lens located at the field stop has been omitted from this drawing to keep the drawing as simple as possible.

An attenuator wheel assembly 213 is positioned so its attenuators 215 are in optical path 202 between second refractive element 207 and field stop 211.

Attenuator 213 includes an attenuator wheel 217 mounted at its axis of rotation 219 between a pair of bearings 221. Wheel 217 carries a series of attenuators 215. An encoder sensor 223 is placed so it is capable of reporting the specific attenuator placed in optical path 202. A motor 225 has a shaft 227 that operatively engages the outer rim of filter wheel 217 with a friction drive 229.

A filter wheel assembly 231 is positioned so its filter 233 are in optical path 202 between collimator 209 and facet 104 or mirror 103. Filter unit 231 includes a filter wheel 235 that carries a plurality of filters 233.

Filter wheel 235 is mounted at its central axis 237 between a pair of bearings 239. A filter wheel drive motor 241 drives a shaft 243 that engages the outer perimeter of filter wheel 235 with a friction of drive 245. A position sensor 247 is disposed relative to filter wheel 235 such that it can determine which filter 233 is in path 202.

Thermo-electric reference system 249 includes three thermo-electric references, a high temperature thermo-electric reference 251, a lower temperature thermo-electric reference 253, and a slewable thermal electric reference 255. Each of these references has a decorrolator tube 257 associated with it.

For the purpose of explaining the relationship between the thermo-electric reference system 249 and the rest of the present invention, the thermo-electric reference system is shown as a single reference unit in this figure. It should be understood that whenever the present specification refers to system 249, the preferred embodiment of the present invention may be reading any one of the three references.

The radiance output from the thermo-electric reference 249 is directed by mirror 259 by a separate optical path 261 through collimator 209. This optical path 261 is arranged so that face 104 of mirror 103 will direct the radiance of the thermo-electric reference system onto the detectors just before it directs the object space information contained in optical path 202. This leading offset is shown by dotted configuration 263 of facet 104 of mirror 103.

Mirror 103 rotates in the direction shown by arrow 127. Its plurality of canted faces are arranged to give a 15° field of view. Thus the tilt between each facet is 0.9375°. Position sensing subsystem 115 is capable of determining when mirror 103 has made one complete revolution and when it rotates through a small part of a rotation.

The infrared radiance reflected from facet 104 of mirror 103 enters optical path 265. An interlace mirror 267 is placed in optical path 265. Interlace mirror 267 is driven by interlace mirror driver 269. A Dewar detector assembly 271 containing a line array of infrared detectors 273 is positioned at the end of optical path 265 downstream from interlace mirror 267. A set of detector optics 275 are placed in pathway 265 between Dewar 271 and interlace mirror 267. A folding mirror 277 is positioned in optical pathway 265 between interlace mirror 267 and relay optics 275.

Infrared line array detector 273 is connected by parallel analog output lines 279 to image processing electronics 121.

Functionally, FIG. 1B shows the scanning system of the high speed infrared imaging system provided by the present invention. The principal moving elemet of the raster scan system shown in FIG. 1B is the scanning mirror 103, which has, in this preferred embodiment, eight facets. Each of these facets is canted at an angle to the vertical. The nominal cant of all of the angles is 45° with the tilt between each facet being 0.9375°.

As the scan mirror is rotated about its vertical axis 113, by the scan mirror drive motor 111, the rotation causes each of the mirror facets to scan the image of the detector array 273 in the horizontal direction in object space.

Vertical scanning occurs as each canted mirror face scans its vertical segment of the object space. As the cant angle changes on each successive mirror face, the next vertical segment is scanned until eight vertical segments are completed. Eech mirror facet will scan the entire 15° horizontal field of view and each mirror facet will scan ⅛th of the full vertical field of view.

The present invention uses canted scanning mirrors to prevent distortion. Distortion in this sense has to do with the non-linear relationship between scanner components angles and the corresponding angles in object space. Distortion can either be horizontal or vertical distortion or both. Positive distortion means that under-scan occurs, i.e., not all of the area to be scanned is actually scanned—there are gaps in the field of view; while negative distortion means overscan occurs, i.e. parts of the field of view are scanned multiple times and the overall field of view dimensions are less than expected. Negative distortion also causes loss of spatial resolution.

The 8-sided scan mirror shown in FIG. 1B produces a minimal deviation from perfect rectilinear scanning. This configuration has no horizontal distortion whatsoever and only slight positive vertical distortion. In fact, for a 15°×15° field of view the maximum distortion is less than one pixel which occurs at the four corners of the field of view for a 256×256 pixel format. The maximum distortion for a 9° horizontal by 15° vertical field of view would be less than one-third (⅓rd) of a pixel. This scanner configuration is effectively "perfect" for the scanner system under consideration.

A further advantage of the scanning system taught by the present invention over former scanner configurations is that, in the present invention, the scan angle is directly related to the mirror rotation angle, unlike prior art system in which the scan angle was twice the mirror rotation angle. This means that the present invention's duty cycle is twice the value taught by the prior art. This means that the electrical bandwidth requirements of the present system are reduced by a factor of two. The sensor system, thermal sensitivity performance is therefore improved by a factor of about the $(2)^{-\frac{1}{2}}$.

As will be explained in more detail in connection with FIG. 3, below, during a complete revolution of scanning mirror 103, a complete field of view is scanned. Because mirror 103 has eight facets, the complete field consists of eight vertical subfields. Because linear detector array 273 has 16 individual infrared detectors, each subfield consists of 16 horizontal lines generated as one facet, i.e., facet 104, of the scanning of the mirror 103 traverses the field of view and directs radiance from the object space to be incident on the 16 detectors in array 273. The detectors of the detector array used by the present invention are separated from one another by one detector width. The eight subfields, consisting of 16 lines each, constitute 128 horizontal scan lines, or one complete field of view. As the eighth canted scanning mirror passes from the field to view, this fact is sensed by position sensor 115 and interlace mirror driver 169 is energized to move interlace mirror 167 on its pivot. This shifts pivot of mirror 167 displaces optical path 265 downstream from mirror 267 by one vertical scan line. The next complete revolution of mirror 103 provides 128 additional scan lines that are vertically interlaced between the preceding 128 horizontal scan lines. As will be described later, the image processor electronics put these direct and interlace subfields together into a 256 horizontal scan line frame.

Scanning mirror 103 rotates at 3600 revolutions per minute, thus a complete field is scanned in 1/60th of a second. However, two fields are required to make a frame because the fields are interlaced. Thus the actual frame rate of the preferred embodiment of the present invention is 30 frames per second. As was discussed above, the complete frame contains 256 horizontal lines and 256 resolution elements per line. There will thus be 65,534 pixels per frame. The selection of this frame format makes it possible for the signals produced by the preferred embodiment of the present invention to be compatible with standard television video formats.

Optically, the Dewar lens 275, which is a collimating lens, projects the image of the Dewar array at infinity. Collimated beam 265 is incident on interlace mirror 267, which, as discussed above, can provide an angular displacement of the detector array by one detector width for the interlace field. Beam 265 is reflected onto the rotating scan mirror 103 and then as beam 202 into collimating lens 209. Hence the reflected beam 202 is focused onto the field stop 211 by the collimating lens 209. Rotation of the scanning mirror 103 sweeps the image of the detector array 273 across field stop 211. The canted facets, e.g. facet 104, step the detector array image 273 in elevation by 1.326° per facet. The objective lenses 207 and 205, which may be interchanged to provide for different fields of view, images the detector array 273 upon the object space of interest.

The passband of all of the optics in the system are designed for the 3 to 11.5 micrometers spectral band.

Dewar detector assembly 271 is a conventional Dewar assembly cooled by liquid nitrogen to 77° Kelvin. Mounted inside the Dewar is at least one multi-detector array 273. In the specific embodiment discussed in FIG. 1B, the multi-detector array consists of 16 vertically stacked parallel scan detectors with a 2 to 1 pitch. These detectors may be made of indium antimonide or mercury cadmium telluride, by means of example.

As will be shown in more detail below, addition of one or more optional detector arrays, with suitable beam splitting optics, can provide for operation of the present invention in two or more spectral infrared frequency bands. Provision for these additional arrays is made so the present invention may operate in two separate frequency bands or may present two-color radiometry to the viewer.

It should be understood when looking at FIG. 1B that the Dewar detector assembly is typically side-mounted off the scanner. Folding mirror 277 is optionally used to complete the optical path into a vertically mounted Dewar detector assembly.

It is also possible to operate the present invention in a non-interlace mode. For a 3600 rpm scanning mirror, the frame rate of the present invention in noninterlace mode would be 60 frames per second. The vertical resolution of the system would be cut in half in the noninterlace mode. However, to maintain resolution in such a non-interlaced embodiment it would only be necessary to provide a detector array with a 1 to 1 pitch.

Thermo-electric referencing system 249 provides for internal blackbody referencing of the detector array.

All multiple detector parallel scan infrared sensor systems taught by the prior art have one common problem. The response of each detector channel, including the detector and its associated electronics, differs from every other detector channel. This does not present difficulty for a single detector system, but rapidly becomes debilitating as infrared parallel scan detectors move to tens of detectors and finally to hundreds of parallel detectors. The prior art has never successfully solved the problem of "matching" the response of each detector channel to the other channels. Failure to resolve this problem yields an undesirable image.

By "matching" it is meant that a single signal output for each channel should be identical with all others over the whole range of radiometric input when viewing the same radiometric source.

The present invention accomplishes matching by allowing each detector to view two known radiometric sources. These sources are black-bodies at temperatures $T_1$ and $T_2$. The resultant signals are noted and each channel is then clamped to an internal reference voltage, i.e. the voltage due to viewing the reference source at $T_1$ is corrected to equal the voltage reference, $V_R$. Next, the gain of each channel is adjusted so that the voltage from each channel due to viewing the referenced blackbody emitter at $T_2$ is equal to some desired value. This process will provide adequate zero and gain correction for the multiple channel parallel sensor system if, and only if, the spectral response of each of the individual detectors is identical and the radiometric input is the same at each detector.

The experience of the inventors in working with their own prior art infrared detector system is that there are slight, but critically important, differences between the response curves of different IR detectors, even if they are from the same manufacturing batch.

To appreciate the significance of such a variation in spectral response, consider two ideal photon detectors with a response from 8 to 12 micrometers and 8 to 11.5 micrometers that sequentially view blackbody radiance sources at 273° Kelvin, 323° Kelvin, and 373° Kelvin. The relative signals from the 8 to 12 micrometer detector are 2.50789, 5.70194, and 10.50814. The signals from the 8 to 11.5 micrometer detector are 2.22747, 5.16183, and 9.63597. Setting the gain of the 8 to 11.5 micrometer detector to have the same span (273° Kelvin to 373° Kelvin), as the 8 to 12 micrometer detector, requires a gain increase factor of 1.0799 to the 8 to 11.5 micrometer detector. Since the transfer functions of each detector (the signal output versus the radiometric input) are slightly different, the output of the gain corrected 8 to 11.5 micrometer detector when viewing the 323° Kelvin source is 5.57407 as compared to 5.70194 for the 8 to 12 micrometer detector. This corresponds to a residual temperature error of about −1.61° Kelvin between the two channels. This degree of error will not typically be observed when a thermal window is set for 100° Kelvin. It would, however, be disastrous for window widths of a few degrees when the window midpoint is set around 323° Kelvin. Note that the residual error is greatest near the midpoint of the "span" used to set the gain and is near zero at each of the end points of the span.

The preferred embodiment of the present invention solves this problem by using a third blackbody radiometric source. This source is variable such that its temperature may be set at the midpoint of the thermal window specified by the operator of the present invention.

Functionally, the present invention first sets the DC level to an internal reference and sets gain of each channel as described below. Then, the system images the third blackbody source, which is set at the midpoint of the thermal window specified by the operator. Each channel is then offset such that the output of each channel seeing this third source is the same. This transfers the maximum temperature error of the system to the outer bounds of the thermal window and provides for zero error at the midpoint of the thermal span under observation.

Each of the three radiometric references used by the present invention is a thermoelectric cooler that operates by the Peltier effect. In the present invention, temperature references 251 and 253 are set at approximately 20° Centigrade and 80° Centigrade, respectively. The third reference, 255, is used to set the center temperature of the span under observation. Its control and references allow it to be rapidly slewed to any set of points between −10° Centigrade and +100° Centigrade for this specific embodiment of the present invention. Specifically, the reference set points are generated by a 12 bit D-A converter that receive its instructions from a read-only memory addressed by operator controls by the master control system, which is explained in more detail below. By interposing the read-only memory in the system, the apparent blackbody correlation is achieved by calibrating the read-only memory with an external blackbody source. This corrects for any effects created by the objective lens assembly and for effects of the temperature references due to their emissivity, bandpass and effects of the condensor tubes 257.

FIG. IC shows an alternate embodiment of the present invention that uses a chopper wheel.

Structurally, FIG. 1C interposes a refractive field lens 302 between objective lens 207 and field stop 211. The position of thermo-electric reference system 249 is shifted such that optical path 261 can pass directly from decorrelator tube 257 through a reference refractive optical element 304 to facet 104 of mirror 103. A chopper wheel system 305 is provided consisting of a chopper disc 307 mounted at its axis of rotation by shaft 309 to drive motor 311. A encoder sensor 313 is provided to sense the position of chopper wheel 307.

FIG. 1C also shows a second Dewar detector array 315 having a second 16-element line array infrared detector 317 connected by parallel electric output lines 319 to image processing electronics 121.

Referring now to FIGS. 1B and 1C, it should be noted that all three temperature references in temperature reference assembly 249 are viewed simultaneously by the detector array at least once per each complete field. As illustrated by FIGS. 1B and 1C, two specific embodiments may be described. The embodiment shown in FIG. 1C utilizes a chopper wheel system 305 in the optical path 265. The other embodiment utilizes a fixed pad mirror 259 in the optical path 261. In the chopper wheel specific embodiment, a particular facet of the scan mirror rotates from the solid line position 104 to the dotted line position 263. External scan radiance is directed away from the interlace mirror and the optical path is interrupted for external radiance by the chopper wheel 307. In the dotted line position 263 of scan mirror 103, collimated radiance from the internal references reflect off the scan mirror at the proper angle to strike the chopper wheel front surface mirror which is rotated into the proper position to complete the optical path from scan mirror 103 to detector line array 273 for the reference radiance. The collimated reference radiance reflects off the chopper wheel mirror 307 to the relay optics assembly 275 and is focused on detector array 273. Therefore, every individual detector in array 273 simultaneously senses the radiance from the particular reference being scanned, which simultaneously produces from each detector the necessary signals required by the image processing electronics system 121 to set the zero gain and to clamp the output voltages at the center span designated by the third slewable blackbody reference 255.

The references in system 249 are geometrically positioned so that a particular, assigned facet of mirror 103 will scan each particular reference source. To assure uniformity of radiance viewed by each detector element in array 273, each individual reference source is viewed through a pyramidal channel condensor 257 to accomplish spatial decorrelation of the reference source. This assures maximum uniformity of reference radiance.

For the specific embodiment of the present invention not employing a chopper wheel, i.e. the one illustrated in FIG. 1B, the dotted line position 263 of the scan mirror occurs before the solid line position shown by facet 104. In the dotted line position of the scan mirror, the angle of the scan mirror is such that the external scanned radiance does not complete an optical path from the scan mirror to the interlace mirror 267. However, the particular reference beam scanned by the particular designated scan mirror facet of mirror 103 does complete an optical path to the interlace mirror. As the scan mirror moves to the solid line position shown by facet 104, the optical path of the scanned reference is broken and an optical path is established between the interlace mirror and the beginning of the horizontal subfield scan of the external object space. Otherwise, operation of this specific embodiment is the same as the specific embodiment employing a chopper wheel shown in FIG. 1B.

It should be noted that the placement of components in FIGS. 1A, 1B and 1C are shown for convenience of illustration of the operation of the preferred embodiment of the present invention and may not represent the actual locations or spatial relationships used in practicing the present invention. Additionally, in FIG. 1B, the field lens was omitted for ease of presentation.

FIG. 2 shows a schematic representation of a Dewar tower 271 of the present invention that incorporates two detector arrays operating at different spectral passbands.

Dichroic mirror 401 is positioned so as to intercept collimated beam 265. A first portion 406 of collimated beam 265 is reflected upward through relay optics 275 onto a line array of infrared detectors 317. A second portion 408 of collimated beam 265 is reflected by folding mirror 410 through relay optics 412 onto linear detector array 273.

Functionally, the Dichroic beam splitting mirror 404 preforms a spectral partitioning of the radiance of collimated beam 265 to be imaged by the appropriate mirrors and relay optics onto infrared detectors arrays 273 and 317. These detector arrays may operate at different spectral passbands and their electrical outputs may be viewed alternately, or in alternate succeeding frames, or simultaneously, depending on the number of parallel features incorporated in the imaging processing electronics of the present invention.

For example, the system could be adapted to scan image radiance in the 3 to 5.5 micrometer band as well as the 8 to 11.5 micrometer band. The response curve of detectors detectors used to sense the 3 to 5.5 micrometer band is significantly different than the response curve of detectors for the 8 to 11.5 micrometer band. Unlike the 8 to 11.5 mirrometer band, the 3 to 5.5 micrometer band does not lend itself to linerization by a quadratic equation. Regardless of the manner in which the output of the two spectral bands sensed by the sensor shown in FIG. 2, the following items will be required for the system:

(1) A second Dewar assembly will be required to contain the 3 to 5.5 micrometer detector array.

(2) A second set of parallel preamplifiers, one per detector, will be required for each detector in the new array.

The operator running the imaging system must have contrl, either manually or by program, in order to select operation of either spectral bandpass. The video system circuits of the present invention require a unique group of constants for the additional passbands. Therefore, switching and control subroutines will be required to inform the appropriate circuits of which bandpass constraints are required when a band change is made. These requirements are described in more detail below. If additional speed of operation is desired, analog processing circuits may be paralleled up to the A to D converter. It may also be possible to simultaneously view both passbands by further duplication of electronics, as will be described below.

Figure 3:
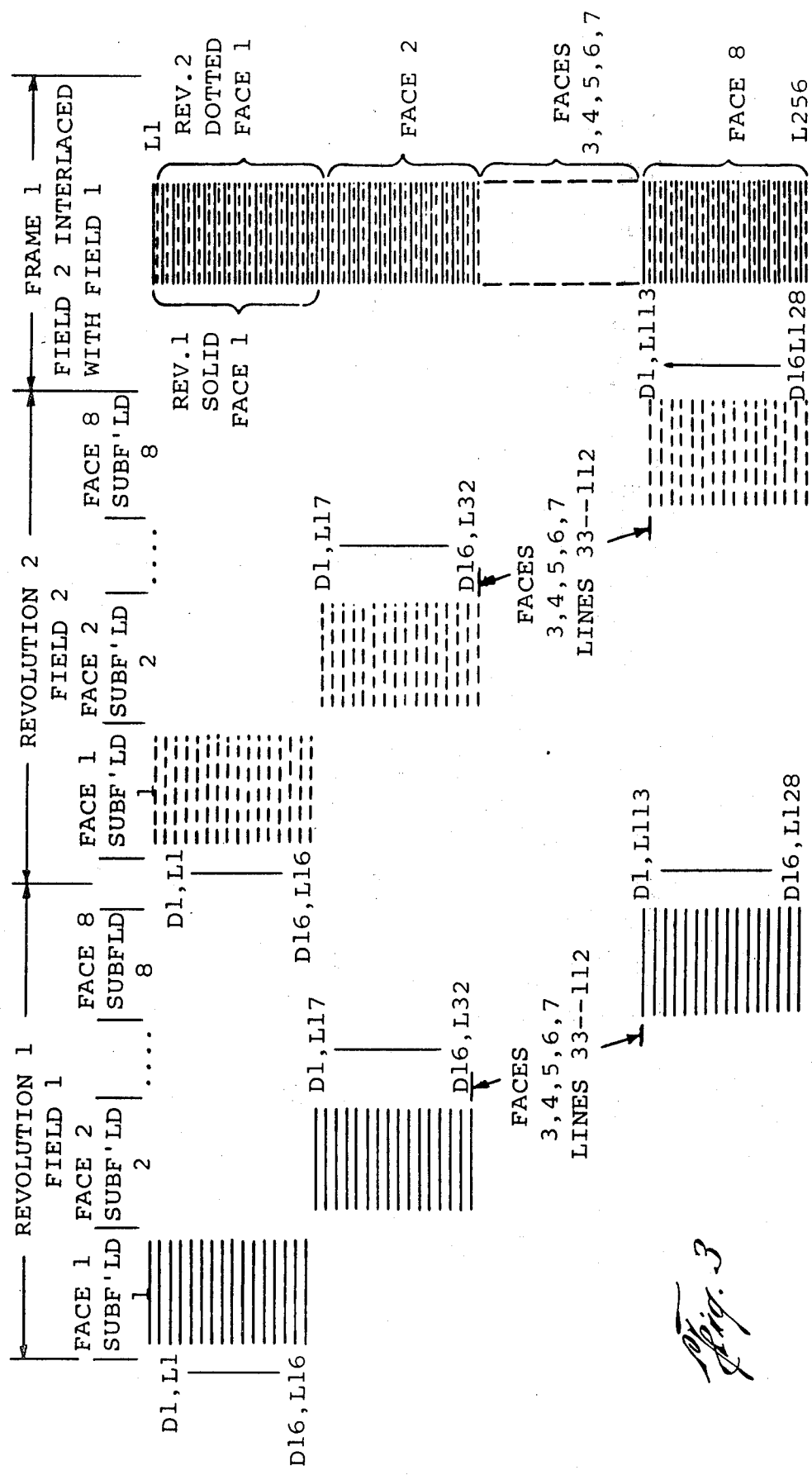
FIG. 3 is a schematic illustration showing how the present invention builds an image frame from scanned subfields that are interlaced together.

FIG. 3 is a schematic illustration of how the present invention constructs a complete field of view. During one complete revolution of the scanning mirror a complete field is scanned. In the preferred embodiment a complete field consists of eight vertical subfields. Each subfield consists of 16 horizontal lines generated as one facet of the scanning mirror traverses the field of view and directs scene radiance to be incident onto the 16 detector array. The eight subfields consisting of 16 lines each, constitutes 128 horizontal scan lines, or one complete field. As the eighth canted scanning mirror facet passes from the field of view, the interlace mirror pivots and shifts the optical path by one vertical scan line. On the next complete revolution of the scanning mirror 128 additional scan lines are vertically interlaced between the preceding 128 horizontal scan lines. This completes a full 256 horizontal scan line frame.

FIG. 4A illustrates the image processing electronics 121 of a preferred embodiment of the present invention. The preferred embodiment shown in FIG. 4A utilizes a 8 to 11.5 micrometers spectral bandpass detector system with an optional 3 to 5.5 micrometers spectral bandpass system that may be selectively displayed by the system operator.

In FIG. 4A, 16-detector array 273, which operates in the 8 to 11.5 micrometer spectral band, is coupled by parallel electrical connections 279 to 16 parallel preamps 502. Each detector in detector array 273 is connected to one of the preamps in preamplifier group 502. Optional 3 to 5.5 micrometer detector array 317 is connected by 16 parallel electrical lines 319 to 16 identical preamplifiers 504. Each of the preamps 504 is connected through bandpass channel select unit 506 to 16 parallel line drivers 508 by 16 electrical lines 510 for preamp group 502 at lines 512 for preamp group 504. The 16 parallel outputs of line drivers 508 are connected by 16 electrical lines 514 to analog processor subsystem 516. The infrared image data output of analog processor subsystem 516 is connected by 16 parallel output lines 518 to a 16-channel parallel A-D converter 520. A status output line 522 of analog processor subsystem 516 is connected to master control system 524. The status output line 526 of 16-channel A-D converter 520 is also connected to master control system 524. The 16 digital data output lines of A-D 16-channel parallel converter 520 is connected by 16 parallel data lines 528 to the memory digital to analog converter and TV formatter unit 530.

The mirror sychronization signals from sensors 115 are input by line 532 to master control system 524. Operator controls 534 output control signals via line 536 to master control system 524.

Master control system 524 outputs control signals to passband channel select unit 506 by means of control line 538. Master control system 524 outputs analog processor subsystem controls via line 540 to subsystem 516. The master control 524 also outputs A-D control signals via output line 542 to A-D converter 520. Master control system 524 also outputs commands to the memory digital to analog and TV formatter system 530 via output data line 544. The master control system 524 also outputs a range midpoint temperature set reference to thermo-electric reference unit 255 by means of output line 546. The master control unit also outputs optional control signals, which may be required by the design of various output devices, along line 548. Finally, the master control system 524 outputs operator status information to the operator control panel 534 by means of output line 550.

The memory, digital to analog and TV formatter unit 530 outputs serial data along line 552. This serial data may be digital video, analog video, formatted video, or any other output that is a function of the infrared input incident on the detector arrays.

Functionally, each infrared detector can be coupled directly to a preamplifier 502. In this embodiment the number of preamplifiers in the system will equal the number of detectors in the detector array. Therefore, in the specific embodiment of the invention taught by this specification, there will be at least 16 preamplifiers per system. Alternatively, the present invention can use a multiplexer between the detectors and the preamplifier. The preamplifiers in preamplifier array 502 and 504 are proprietary design low-noise high band-width units developed by Texas Medical Instruments, Inc., San Antonio, Texas. Similar, though less efficient units, could be designed by any electrical engineer possessing ordinary skill in the art of electric circuit design. The Texas Medical Instruments units possess equivalent input noise characteristics better than one nanovolt per root Hertz and possess wide band-width characteristics consistant with information theory.

The 16 preamplifier outputs 502 from preamplifier set 504, which is associated with the 3 to 5.5 micrometer array 317, is input to the passband channel selector 506. The output 510 of preamplifier modules 502, which are associated with the 8 to 11.5 micrometer detector array are also input to this selector. Selector 506 is essentially sixteen-decimal-pole-double-throw analog switch. In one state, it switches the output of lines 512 into line drivers 518. In the other state it switches the output of lines 510 into the line driver array. This switching select function is accomplished by signal from master control system 524 by means of control line 538.

Functionally, therefore, the preamplifier outputs are coupled to the line drivers. The line driver array 508 provides drive current for all of the circuits in the remainder of the electronics processing unit.

The analog processor subsystem 516 is a group of electric circuits that process all of the incoming video signals according to the operator's inputs set by the operator through the master control system 524. Specifically, processor 516 accomplishes the following functions in realtime:

(1) Corrects for differences in detector response between different detector elements.

(2) Corrects for differences in preamplifier gain from channel to channel as well as variations or drift within a single channel.

(3) Corrects for any variations in transmittance along the optical pathway between the primary lens assembly field stop and the detector array.

(4) References the incoming infrared video signals to known radiant sources.

(5) Linearizes the inherently non-linear voltage to temperature relationship of the detector versus the blackbody temperature of the reference emitter.

(6) Normalizes the linearized signals for all detector array channels.

(7) Performs the sensitivity or window control function and normalizes the output such that the peak to peak voltage is always the same regardless of sensitivity setting.

(8) Automatically corrects for any D.C. drift or offset that may occur in the processor circuitry.

The function of the analog processor subsystem 516 is more specifically described in connection with FIG. 5, below.

The 16 analog output channels of the analog processor subsystem 516 are fed by lines 518 to A-D converter 520.

In the preferred embodiment of the present invention, 16 A-D converters or their equivalent are required. Each A-D converter, in the specific embodiment of the present invention, takes 256 data samples as each mirror facet rotates through its horizontal field of view. The output of the A-D converter is in 16-line parallel form. The output of each A-D converter, therefore, consists of 256 samples of 8-bit binary data in parallel form. This forms one horizontal scan line of the horizontal field of view. This is explained more fully below in connection with FIG. 6.

Later circuit manipulations may convert this binary parallel data stream into a format suitable for digital tape recording or computer storage. Alternatively, the data may be converted back into an analog format suitable for driving a standard TV monitor. Therefore, in the preferred embodiment of the present invention shown in this specification, as one mirror facet of mirror 103 rotates through the 15° field of view, 16 horizontal scan lines will be generated. These 16 lines constitute one subfield as was shown above in connection with FIG. 3. As the eighth and last mirror facet passes from the field of view, eight subfields will have been generated, creating one complete vertical field during one revolution of the scanning mirror. The data generated by these operations is transferred to and stored sequentially in memory unit 530 until the complete subfield is assembled. As the next subfield is generated and transferred to memory, the preceding subfield is being organized into the appropriate format for immediate recording, display on a TV monitor, or storage in a computer. This process is a continuous stream process during normal system operation. In the preferred embodiment of the present invention, the TV monitor format is the "EIA RS 170" format.

In the preferred embodiment of the present invention, during the time between completion of the eighth and final subfield of each revolution of the scanning mirror 103 and the beginning of the next subfield, a signal is sent to the actuator for the interlace mirror. The interlace mirror then pivots which displaces the scanned scene radiance by one vertical resolution line. The interlace mirror remains in this position until the end of the next revolution, i.e. the next pass of the final eighth facet of mirror 103, at which time it returns to its original position. Two fields of interlaced data are generated during these two resolutions. Simultaneously they are processed to complete one frame of data for the complete field of view as per FIG. 3.

In the preferred embodiment of the present invention described in this specification, the rotating scan mirror 103 operates at 3600 rpm. This means that 28,800 mirror facets rotate through the field of view of the primary lens assembly in one minute. In one second, 480 facets pass through the field of view, i.e., 2.08 milliseconds per facet. The scanning efficiency of the present invention is expected to be approximately 3.3%, resulting in a useable time of approximately 688 microseconds per mirror facet. Further dividing the anticipated maximum useful time of 688 microseconds into 256 sample periods indicates that about 2.5 microseconds is the time that should be available for multiplex and converting, transferring and storing the process video data. These parameters indicate that multiplexing of the system should be possible due to the speed at which current state of the art analog to digital 8-bit converters operate.

Multiplexing may be accomplished as follows in the preferred embodiment of the present invention. If an operator chose to multiplex the processed video data from two detectors, i.e. $D_1$ and $D_2$, into one analog to digital converter while maintaining a data rate of 256 samples per detector per mirror facet, it seems possible that one sampling period could be used to sample two detectors. Both $D_1$ and $D_2$ would be sampled in 2.72 microseconds. Therefore, 1.36 microseconds would be the time available for sampling one detector via its associated analog to digital circuit. During this 673 nanosecond period: (a) the multiplex from a switch "on" command settle and transfer process to video to the analog to digital converter; (b) the analog to digital converter must convert and latch the data; (c) the external latching circuits must acquire the converted processed video, now in the form of 8-bit binary data words; and (d) the external latch must, on command, transfer the 8-bit word to storage. Presently available analog to digital 8-bit converters can make a conversion in 33 nanoseconds and solid state switching devices are available for use in multiplexing circuits that can switch in 50 nanoseconds.

The digital logic circuits of the present invention, including all analog to digital conversion as well as the control command system 524 is judged by the inventors of the present invention to be well within the state of the art of digital circuit design. Since these circuit elements are extremely complex, they are being omitted in the interest of keeping this specification to a reasonable size.

The parallel data stream's output from A-D converter 520 travel over data path 528 into system memory digital to analog conversion in the TV formatter 530.

These digital video data circuits, although performing an overall complex reformatting task, are actually a set of subfunctions each one of which is a relatively straightforward design.

In the preferred embodiment of the present invention, the data are to be displayed as a 256 by 256 array. To display the 256 lines on a standard 525 line interlaced field TV monitor, only one of two normally available fields is utilized. Since the detector data are in an interlaced pattern of two 128-line fields, the TV field used is subdivided into two corresponding subfields 128 lines each. Thus during the first 128-line field the data will be written on lines numbered 1, 5, 9, etc. During the second of the two 128-line fields, the data will be written on lines 3, 7, 11, etc. Display lines not being written with data will be blank, i.e., written with zero data.

For the 16-detector array specific embodiment shown in this specification, the detector data is a sequence of 16-line subfields. These subfields come into memory either simultaneously in the form of 16 8-bit words or multiplexed into pairs of eight simultaneous 8-bit words. This subfield, 16 lines high by 256 pixels wide by 8-bit deep, is written into random access memory. It is then readout to the display. The display requires that lines be read sequentially, with blank lines inserted as described previously.

The reformatting functions of memory D-A and formatter 530 are therefore reduced to moving data to and from memory according to a predetermined repetitive pattern. The circuits to do this are well within the state of the art, but they are quite complex and thus are shown only as a block diagram in FIG. 5B below.

The output of the formatter unit 530, which is shown schematically as line 552 in FIG. 4A, may be either digital video, analog video, formatted TV signals or any other optional output that can be produced as a result of algorithmic processing of the data in memory.

The master control system 524 implements all of the system timing and control formatting. Synchronization signals from rotating scan mirror 103 are received into the master control system by line 532. This enables the master control system to time the action of the entire system in realtime synchronization with the rotation of scan mirror 103. The master control system will generate various high speed routines to control synchronous events throughout the system circuitry. Many of these control functions will be implemented by high speed subroutines. This structure is preferred in order to perform the high speed control requirements. Since timing of all action in the system is synchronous with the rotation of the scan mirror, slight variations in motor speed will not upset the precise timing of event sequences of the system. Nonsynchronous signals will be received by the master control system from operator inputs and will be encoded and distributed to the appropriate circuitry. Like the analog processing subsystem 516 and the formatting subsystem 530, the circuits required to perform these functions are complex, but well within the skill of the art of a person knowledgeable in digital design.

FIG. 4B illustrates a functional block diagram of the system electronics of the preferred embodiment of the present invention like that shown in FIG. 4A. The difference is that FIG. 4B illustrates the inclusion of 16 optional line drivers 602 which are connected to the output of the preamps 504 which are in the 3 to 5.5 micrometer detector train. These optional line drivers drive optional analog processor 604 whose output passes to passband channel selector 506. The inclusion of these additional 16 channels of parallel line drivers and optical processors allows the master control system to switch the passband channel selector each frame. Thus alternating frames of the display can be in the 3 to 5.5 micrometer bandpass and the 8 to 11.5 micrometer bandpass.

FIG. 4C illustrates a system as in FIG. 4B, except that the parallel data stream from the 3 to 5.5 micrometer detector array has been carried through to include a set of D-A converters 702 and an optional formatter 704. The passband channel selector has been eliminated and the system as shown in FIG. 4C is capable of displaying both passbands simultaneously.

Figure 5A:
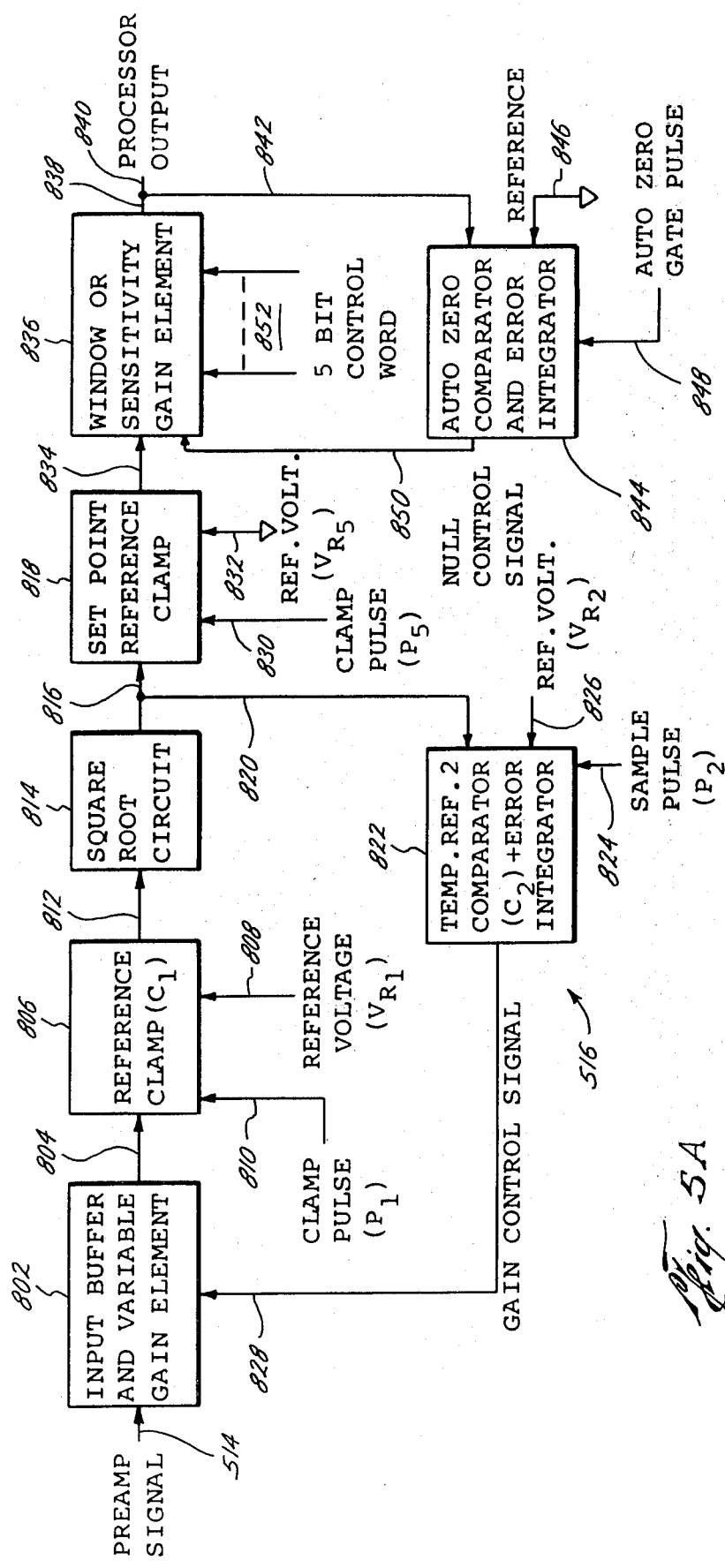
FIG. 5A is a block schematic diagram of the analog processor circuitry for a single channel of the present invention.

FIG. 5 illustrates a simplified block diagram showing one channel of the 16-channel analog processing system 516. In FIG. 5A, line 524 from line driver 508 inputs a signal to the preamplifier into an input buffer and variable gain amplifier 802. The output from this controllable gain amplifier and buffer unit passes through line 804 to a reference clamp amplifier 806. A reference voltage from a reference voltage source, not shown, is input to the reference clamp by reference voltage line 808 and a clamp pulse may be input controllably to reference clamp unit 806 through line 810. The output from reference clamp circuit 806 passes through line 812 to square root circuit 814. The output from square root circuit 814 passes by line 816 to set point reference clamp unit 818 and also by line 820 to a temperature reference comparator and error integrating unit 822. A sample pulse input line 824 and a second reference voltage input line 826 is input to comparator and error integrator 822 from a second reference voltage source, not shown. The output of comparator and integrator 822 is a gain control signal which passes through gain control signal line 828 and forms an input line 828 to buffer and variable gain element 802. The set point reference clamp unit 818 has a input that is a clamp pulse line 830 and a third reference voltage input line 832 which is driven by the set point reference voltage generator in the operator control unit. The output of set point reference clamp unit 818 passes through line 834 and is an input to window sensitivity gain element unit 836. Gain element 836 is set in a feedback loop such that its output from line 838 passes both to the processor output line 840 and to the input 842 of auto-zero comparator and error integrator 844. Other inputs to error integrator and comparator 844 are a fourth reference voltage which is placed on line 846 and an auto-zero gate pulse line 848. The output of auto-zero and comparator and error integrator 844 passes by null-control signal line 850 back into sensitivity gain element 836. Window unit 836 is also controlled by the input of a 5-bit digital control word through input data line 852.

Functionally, the video signal from the preamp of each channel is a non-linear function of the sensed object's temperature. This function changes with detector response optical passband and many other factors. Within the temperature range of interest to the preferred embodiment of the present invention, in the 8 to 12 micrometer spectral passband, this function can be represented by a quadratic equation. Therefore, it is feasible to perform realtime linearization of the function.

Based on the present inventors' experience in designing processor circuits implementing the quadratic linearization concept, the preamp signals of the present invention should be capable of being linearized to within a few tenths of a degree in the range between 0° and 100° Centigrade (8 to 12 micrometers) and it appears that excellent linearity can be achieved well beyond these limits.

As an example of the above, if one calculates the correlation coefficient for a quadratic fit in the range of 260° Kelvin to 400° Kelvin for 7.5 to 11.5 micrometers, the value is 0.9999 with an error of +0.5° Kelvin at 400° Kelvin and −0.5° Kelvin at 260° Kelvin. If we use a 40 dB attenuator and look at the range of 700° Kelvin to 1500° Kelvin, the correlation coefficient is better than 0.9999 which indicates excellent results are possible in the 7.5 to 11.5 micrometer spectral bandpass.

The circuitry shown in FIG. 5A processes the temperature to signal function as follows:

If we define the preamp signal "S" versus temperature "T" by the equation $S=aT^2+bT$, where "S" is in volts and "T" is in degree Centigrade, then in order to linearize the equation, the processor should solve the function $S_2 = -K_1(K_2(S)+K_3-\frac{1}{2}$. Where "$S_2$" is the linearized signal and "$K_1$", "$K_2$" and "$K_3$" are constants. The processor circuit shown in FIG. 5 solves this equation as follows: the preamp signal "S" is acted upon by gain element 802 to generate the function $K_2S$ which passes along line 804. This signal is then added to the constant, $K_3$, by reference clamp 806 to generate the function $(K_2S+K_3)$. It should be noted that the reference clamp 806 performs the dual function of signal restoration at the reference temperature $T_1$ while simultaneously adding the constant, $K_3$, to the system signal. The reference voltage input to reference clamp circuit 806 for $T_1$ plus the constant, $K_3$, voltage is supplied from the control subsystem. The root of $+(K_2S+K_3)$ is then extracted by the square root computing circuit 804. The offset constant $K_1$ is subtracted from the square root value by the reference clamp unit 818. The set point reference clamp 818 performs a dual function of removing the offset constant, $K_1$, as well as centering the linearized video signal at ground reference by clamping when the detector views the set point temperature reference. The gain control signal from temperature reference comparator and error integrator 822 is derived by comparing the output of the square root circuit 814 to a reference voltage. This comparison is sampled and the difference is integrated each time the detector views the referenced temperature, $T_2$, and is set by the reference constant supplied by the master control system, thus automatically generating the proper gain control signal.

The window or sensitivity gain element 836 is constructed around the window control circuit. Rather than being continuously variable, the gain for unit 836 is changed in discrete steps by a static digital word through input 852. Zero drift is accomplished by feedback auto comparator and error integrator 844 which operates as a null-control signal by comparing the output of window sensitivity gain element 836 with ground reference during the time the video signal is off.

The net result of the circuitry shown in block diagram on FIG. 5A is got by supplying the same two static reference voltages, i.e. that input by line 808 and line 826 and the same static digital word input through line 852, to all channels of the multi-channel system, the functions (1) through (8) described above in connection with the video processor are implemented simultaneously for all channels.

Optionally, radiance may be displayed by the present circuit by bypassing the square root unit 814 and updating the reference contant voltages supplied to line 808, 828 and 852, which will again implement features (1) through (8) listed above in connection with the description of the video processor, with the exception of item (5), which would no longer be applicable.

It should be noted that the functional form, $S=aT^2+bT$, does not work well for linearizing the 3 to 5.5 micrometer spectral passband. However, preliminary analytical computations indicate that for the 3 to 5.5 micrometer band an ideal photon spectral response, a correlation coefficient of 0.999 is achievable by the use of the equation, $S=aT^B$, thus indicating the feasibility of designing a realtime linearization circuit.

Figure 5B:
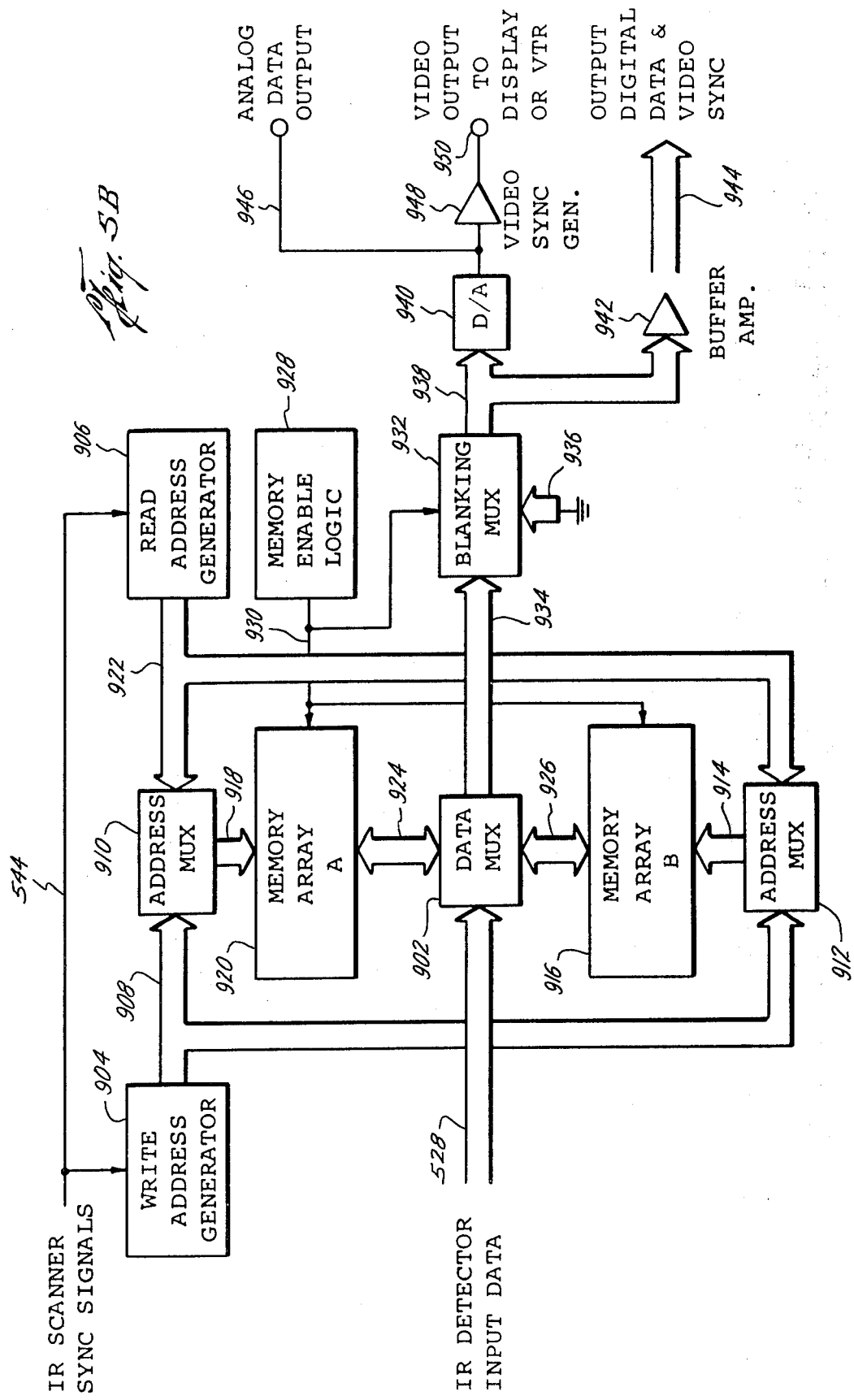
FIG. 5B is a schematic block diagram of the formatter subsystem of the present invention.

FIG. 5B shows a functional block diagram of the memory and data formatter 530.

IR detector input data lines 528 enter data multiplexer 902. Infrared scanner synchronization signals from the master control system 524 come into the formatter system through line 544 to write address generator 904 and read address generator 906. A data pathway 908 connects write address generator to the address multiplexer for memory array A910 and the address multiplexer for memory array B912. Address multiplexer B is connected by a data path 914 to memory array B916.

Address multiplexer 910 is connected by data pathway 918 to address memory A920. Likewise, read address generator 906 is connected by a data bus 922 to address multiplexer 910 and address multiplexer 912. Memory array A920 is connected by data bus 924 to data multiplexer 902. Memory array B916 is connected by data bus 926 to data multiplexer 902. Memory enable logic unit 928 is connected by line 930 to memory array A920, memory array B916 and blanking multiplex unit 932. Output data bus 934 from data multiplexer 902 is connected as an input to blanking multiplex unit 932. The other input to blanking multiplexer 932 is data bus ground 936.

The output data bus 938 from blanking multiplexer 932 is an input to the parallel digital to analog converter channels 940 and to the output digital buffer amplifiers 942. The output from the digital buffer amplifiers is a output data bus 944. The output from the D-A converter system 940 is supplied both to analog data output line 946 and as an input to video sync-generating subsystem 948. The output of video sync-generating subsystem 948 is a video output display line 950.

Functionally, the detector subfields are written alternately into two memory arrays, 920 and 916. For example, while the first subfield is being written into memory array 916, the data from the preceding subfield is being read out of memory array 920. Next, while the following subfield is being written into memory array 920, the data from the subfield first mentioned as being written into memory 916 will be read to the display. The digital data output from memory is converted into analog format by D-A converter 940 and a standard television composite signal is generated using one of the several available TV camera sync-circuit generator chips 948.

The detector image is displayed in a rectilinear format. Note that about 12 lines of data will be lost due to the lack of available display lines on a standard television monitor. However, all 256 lines of data are capable of being output through line 944 to a digital recorder. Since the normal television horizontal to vertical aspect ratio is 3:4, an area at the edge of the screen of full screen height and 25% of the screen width (or 33% of the detector image width) is available for other purposes, such as gray scale calibration patterns and data annotation. This can be introduced by extension of the random access memory array beyond 256 words or from a separate random access or read-only memory source.

The basic timing calculations for formatter 530 are as follows. The frame rate of the scanner is the same as the frame rate of the display (1/60th of a second equals 16.67 milliseconds). A time of 2.083 milliseconds is the maximum time available to write 32 lines of one display field (16.67 milliseconds divided by 8). This corresponds to one detector subfield of 16 lines. The efficiency of the detector scan mirror is assumed to be 1/6th; therefore, the data from one subfield is written into memory in 694 microseconds. The 16 subfield lines are presented as simultaneous 8-bit parallel words. The input data rate is therefore 2.5 microseconds per pixel. I the 16 lines are multiplexed into eight lines, the rate is doubled to 1.347 microseconds per pixel. The output data rate to the display is determined to be 160 nanoseconds per pixel. Memory chips are commonly available as cycle times on the order of 30 to 100 nanoseconds so these data rates present no memory probelems even if commercially available memory is used for the system.

The total elapsed time to read a subfield to the display is about 2 milliseconds. The display will be synchronized so that the subfield read begins approximately 0.8 milliseconds following the completion of the input of that subfield data from the detector. The intent of this is to center in time the burst of subfield data from the detector with respect to the subfield readout interval. This allows approximately 0.8 milliseconds of unused time both before and after the input data burst, within which the input data can vary, due to irregularities in the rotation or manufacture of the scanning mirror, without affecting the synchronization of the data input. Any systematic component in the scanning mirror error will be cumulative and will eventually result in loss of data unless the readout rate to the display also tracks the systematic component. Therefore, it is planned that the mean frequency of the scanning mirror synchronization signals will be used to control the oscillator driving the composite video syncgenerator. This prevents data loss due to systematic drift in the scan rate while short-term variations are absorbed by the 0.8 millisecond subfield timing tolerance. It is the inventors' belief that a laboratory television monitor, adjusted to the nominal frame rate of the present invention, will follow all variations in this rate without losing synchronization.

In the preferred embodiment of the present invention, the memory chips are assumed to be 2K-bits capacity organized in 512 words of 4-bits each. If chips organized at least 1,024 words long are used, an alternate design can be made wherein both memory arrays occupy the same chips, one using the first 512 words and the alternate using the latter 512 words. Although this practice would save some memory chips, the timing problem becomes more complex due to having to interleave the read-write commands and the unequal data rates. In the design used by the preferred embodiment of the present invention, using 8-bit data words and assuming 512 words by 4-bit memory chips, 32 memory chips are required for each memory array. The address and data lines for each memory array are switched from the data input circuits to the display output circuits by multiplexers, which are available commercially. The direction of the data multiplexers will be controlled by the read-write command to the memory chips. Each memory array will be entirely read or entirely write and will alternate between these modes, the two arrays being mutually out of phase. All memory chips in an array will receive a common data address from the appropriate data or display address counter. Which chips are actually active will be determined by the chip enable line 930. The chip enable line 930 is thus the key to reformatting as performed by formatter 530.

In the modem in which data is written into memory, all memory chips in the array will be enabled. Thus the data in each of the 16 lines is stored at the same address in the respective chips. In the display output mode, the enable valid line 930 will step sequentially through the array of chips enabling only that chip containing the data for the display line desired. For example, to sample the 16 lines, the enable may be the output of a 4-bit to 16-line decoder, clocked by a carry signal at the end of the 320-count address generator. Thus the lines would be written to memory simultaneously and readout sequentially. The digital output data is converted to analog by a video rate D-A converter 940 and formatted to video standard RS 170 or other required standard using conventional TV sync-generator chip 948.

Appropriate line blanking is accomplished by feeding "zero" data to the D-A converter when blanking is required. This is done with a blanking multiplexer 932 at the D-A input which is switched between detector data from data bus 934 and ground potential through ground bus 936.

This field blanking requires synchronization between the incoming detector data and the display field timing. This synchronization is accomplished by reset synchronization pulse generated by the sensor 115 on scanning mirror 103. This output goes to the vertical raster scan reset input of the television sync-generator. This causes the sync-generator to begin generating the raster of the "odd" field. Since the scanning mirror sync occurs once per revolution, i.e., every 60th of a second, the sync-generator is continually reset at the display field rate and so generates only the odd field. Thus, the interlace "even" display field is suppressed by not permitting the sync-generator 948 to generate the even raster pulse sequence. The formatter of the present invention is recognized by the inventors to be a very complex piece of electronics. Virtually all digital electronics that was multiple data paths and have complex timing are complicated. It is believed, however, that given the information in this specification, a person of ordinary skill in the art of digital design could design, build and use this part of the preferred embodiment of the present invention.

FIG. 6 shows a block schematic diagram illustrating the relationship between the operator controls and the master control system, i.e. master control 524 and operator control 534 of FIG. 4A.

FIG. 6, a settable center window temperature switch 1002 drives parallel electric lines 1004 to a window signal converter 1006. Window signal converter 1006 drives a window signal data bus which is line 852 of FIG. 5A. Optional function controls 1008 provide any necessary input that may be required for the optional functions of the present invention to the digital control system and read-only memory and digital steerage circuits through line 1010. A reference temperature set point selection control 1012 provides digital set point information by lines 1014 to a read-only memory lookup table and digital steerage circuits 1016. The digital circuits of processor 1016 contain, the read-only memory lookup tables, the constant information required to solve the quadratic equations discussed in connection with FIG. 5A, above. Process 1016 provides a first digital output 1018 which drives a digital to analog converter 1020 to provide a temperature reference voltage which is input to set point reference clamp 818 through reference voltage input line 832 in FIG. 5A. Second digital output 1022 from processor 1016 drives second digital analog converter 1024, which provides a reference voltage output to line 808 of FIG. 5A which is the referenced constant input to reference clamp 806. A third data line 1026 from processor 1016 drives a third digital to analog converter 1028 which produces a second reference voltage output which is input to the reference comparator and error integrator 822 of FIG. 5A through input reference voltage line 826. Digital control and timing format system 1030 has a synchronization signal input 532 from the mirror position sensing system 115. It also has an input 1032 from the master control system processor clock, not shown. Digital control system 1030 outputs various control signals used by the D-A converter subsystem and the formatter subsystem for data multiplexing. These outputs are shown in FIG. 6 as output lines 1034.

The preferred embodiments shown above are illustrative of the best way the inventors presently know to practice the present invention and should not be considered to limit the scope of the present invention. The present invention should be limited only by the following claims and their legal equivalents.

We claim:

1. A method of calibrating an imaging system having a plurality of detectors, comprising:
    adjusting a slueable radiance source within about the range of radiance to be sensed by the imaging system,
    sensing the slueable radiance with a plurality of detectors, and
    clamping the output of each detector of said plurality to an internal reference.

2. A method as in claim 1 wherein said output of each channel is clamped to the average value of the output of said plurality of detectors while said detectors are sensing said slueable radiance source.

3. A method as in claim 1 wherein said output of each channel is clamped to the output of one of the channels while said detectors are sensing said slueable radiance source.

4. A method of calibrating an imaging system having a plurality of detectors and detector channels comprising:
    sensing a first reference radiance source with a plurality of detectors,
    adjusting the output of each of the detector channels as a function of a first internal reference,
    sensing a second reference radiance source with said plurality of detectors,
    adjusting the output of each of the detector channels as a function of a second internal reference,
    adjusting a slueable reference radiance source to within about the range of radiance to be imaged by the imaging system,
    sensing said sluable reference radiance source with said plurality of detectors, and
    clamping the output of each detector channel to the average output of the plurality of detector channels.

5. A method as in claim 4 wherein the output of each detector channel sensing said slueable reference radiance source is clamped to the output of one of the detector channels.

6. A method as in claim 4 wherein the second reference source is a greater radiance than the first reference and the slueable reference radiance source is intermediate said first radiance source and said second radiance source.

7. A method as in claim 4 wherein the output of each detector channel sensing said slueable reference radiance is clamped to a third internal reference.

8. A method as in claim 5, 6 or 7 wherein said plurality of detectors are all the detectors in the imaging system.

9. An apparatus comprising:
    scanning means for scanning radiance in object space, said scanning means comprising a multi-faceted, tilted-faced mirror having an axis of rotation perpendicular to the object space;
    reference radiance source means for providing calibration information to said scanning means, said reference radiance means comprising two fixed references of differing radiance and a third slueable reference radiance;
    detector means responsive to said scanning means and said reference radiance source means for converting sensed radiance to electrical signals, said detector means comprising a plurality of detectors responsive to the spectral band sought to be sensed in the object space;
    signal processing means for electronically processing said electrical signals to form image signals, said signal processing means comprising: a preamplifier for each detector; analog processor means for clamping said electrical signals from the detectors to internal reference voltages when said detectors are sensing said fixed and slueable reference radiances; formatting means responsive to said electrical signals for generating digital and analog video signals; and
    diaplay means responsive to said image signals for displaying an image of the radiance in object space.

10. An apparatus as in claim 9, wherein said scanning means has eight faces which are offset about a nominal 45° angle to provide for vertical scanning of the detector array into object space;
    said reference radiance source means are thermoelectric devices capable of being set at temperatures between −10° and +100° Centigrade,
    said detector means is a line array of infrared detectors, and
    said analog processor means includes means for converting the detector array output from representing radiance values into apparent radiometric temperature values.

11. An apparatus as in claim 10 wherein
    said scanning means rotates at a speed that causes the imaging system to operate at a frame rate of 60 frames per second.

12. An apparatus as in claims 9, 10 or 11 wherein at least a part of the signal processing means is shared by means of multiplexing.

13. An apparatus as in claims 9, 10 or 11 including interlace optic means for offsetting the detector array in object space by one detector width during every second revolution of said scanning means, and
    said detector means is a line array whose individual detectors are set apart by one detector width.

14. An apparatus as in claims 9, 10 or 11 including a beam splitter means for dividing said sensed radiance into a plurality of beams,
    a plurality of detector arrays positioned so as to be responsive to said plurality of beams, and
    switching means between said plurality of detector arrays and said signal processing means for selecting the detector array whose electrical output is to be processed to form an image.

15. An apparatus as in claim 14 including a plurality of signal processing means responsive to the electrical output of said plurality of detector arrays.

16. Method as in claim 1 wherein said slueable radiance source is adjusted to the mid-point of the range of radiance to be sensed by the imaging system.

17. A method as in claim 4 wherein said slueable radiance source is adjusted to about the mid-point of the range of radiance to be imaged by the imaging system.

18. An apparatus as in claims 9, 10 or 11, wherein said detector means is a time-delayed and integrated plurality of infrared detectors.

19. An apparatus as in claims 10 or 11, wherein said formatting means includes a digital memory containing memory elements sufficient to store not more than two subfields of data.

20. An apparatus as in claims 10 or 11, wherein said formatter means generates a composite video signal that utilizes only one television field.

* * * * *